J. ELLIS.
METHOD OF MAKING RUBBER TYPE STAMPS.
APPLICATION FILED NOV. 3, 1917.
1,332,169.
Patented Feb. 24, 1920.
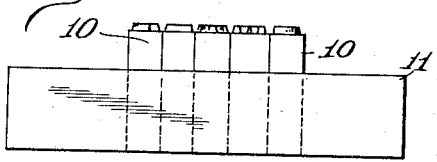
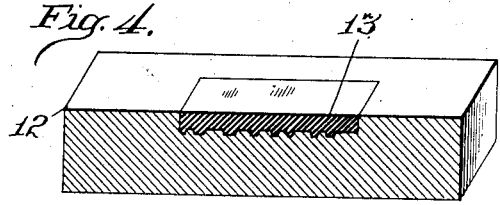
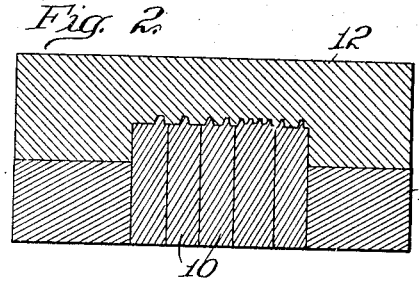
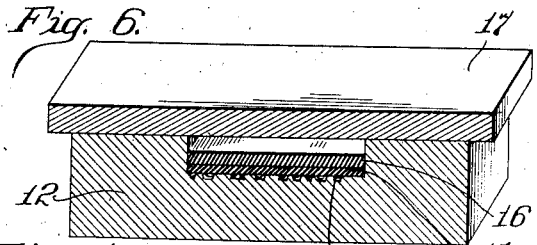
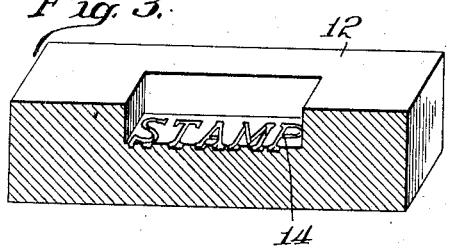
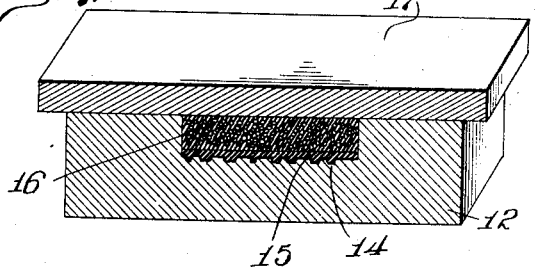
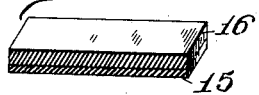
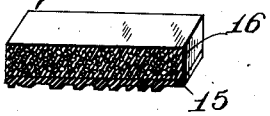
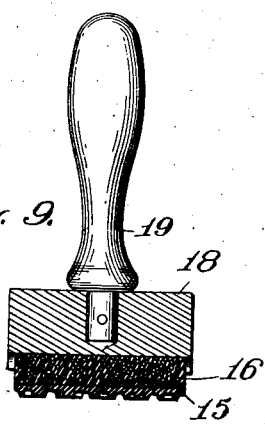
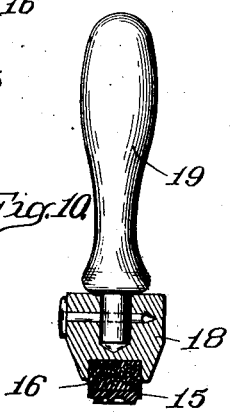
Witnesses
Milton Lenoir
Inventor
Joseph Ellis
By Arthur L. Sprinkle
Attorney

UNITED STATES PATENT OFFICE.

JOSEPH ELLIS, OF CHICAGO, ILLINOIS, ASSIGNOR TO FEATHEREDGE RUBBER COMPANY, A CORPORATION OF ILLINOIS.

METHOD OF MAKING RUBBER-TYPE STAMPS.

1,332,169.      Specification of Letters Patent.      Patented Feb. 24, 1920.

Application filed November 3, 1917. Serial No. 200,190.

*To all whom it may concern:*

Be it known that I, JOSEPH ELLIS, a citizen of the United States, residing at Chicago, in the county of Cook and State of Illinois, have invented certain new and useful Improvements in Methods of Making Rubber-Type Stamps.

The invention relates to rubber type stamps, and more particularly to that portion of rubber type stamps usually made of rubber or its compounds, including the part in which the type is formed. In the art of making rubber type stamps as heretofore practised an unvulcanized compound of rubber which is in plastic condition is given an impression to form the upstanding type portion by being brought forcibly into contact with a previously prepared matrix usually formed of some suitable material as plaster of Paris or a mixture of clay and putty or other materials of a plastic nature, which will harden either upon cooling or the application of heat or other subsequent treatment. A thin sheet of type compound is caused to receive the impression of this type matrix and this compound and the matrix may then be subjected to vulcanizing heat, it being understood of course that the compound has been previously supplied with an ingredient as sulfur, which will result in vulcanization of the compound upon the application of a vulcanizing heat.

After the type material which is relatively thin is vulcanized it may be stripped from the matrix and is ready to be fabricated into a stamp, which is usually done by mounting the same upon a cushion of sponge rubber, the latter being rubber of a porous or cellular nature formed in the usual manner in which sponge rubber is made by subjecting a raw or unvulcanized rubber compound having gas forming ingredients therein, which will gasify upon the application of the usual vulcanizing heats. As a matter of general practice the custom is for the manufacturer of rubber type stamps to purchase the sponge rubber backing material from rubber manufacturers in sheet form already vulcanized, and in its expanded or sponge rubber condition. This practice makes it necessary that the stamp manufacturer purchase the vulcanized sponge rubber on the market in a vulcanized condition, and then either prepare or purchase the sheets of type compound in an unvulcanized condition. After the type material receives its impression in the matrix and is vulcanized it is necessary to cement the same to a strip of the previously vulcanized sponge rubber backing material which is a distinct manufacturing operation, and is oftentimes difficult to accomplish in a cheap manner, because of the difficulty of causing two separately vulcanized strips or pieces of compound to permanently and properly adhere. In addition to the excessive labor involved in separately vulcanizing the sponge rubber backing and the type portions of the compounds there is the further difficulty with the prevailing method that the value of the stamp may become impaired by the separation of the type portion from the backing strip due to the effect of the ink upon the cementing materials employed or other causes during the life of the stamp.

It is the primary object of the present invention to provide two forms of raw rubber compound, one layer of which may be suitable for the making of the type surface, and the other portion of which may when vulcanized make a suitable sponge rubber backing for the type portion, these materials to be united or caused to adhere in the raw or unvulcanized condition, and subsequently after receiving the type impression from the matrix to be vulcanized simultaneously so that there will be a complete physical union between the cushion portion and the type portion of the stamp, dispensing with the separate vulcanizing operation for the sponge rubber backing and making it possible for the stamp manufacturer to purchase all of his rubber or rubber compound materials from a single manufacturer, thus producing a superior article to the stamps in which the type portions are united to the sponge rubber backing after vulcanization of each, and at the same time effecting certain economies in manufacture.

Another important object of the invention is to provide an improved process and apparatus in which the stratum of type forming rubber compound may be maintained under gaseous pressure at the time of vulcanization, while the same is held in a plastic condition within the type forming matrix, thus causing the molecules of the rubber compound to be forced under pressure into the type grooves of the matrix, resulting in perfectly formed rubber type of a firm character and making more certain the perfection in rubber type manufacture and guarding against loss due to the imperfect type formation, such losses having heretofore been very excessive unless the greatest care was exercised. My invention applying the gaseous pressure at the instant when the heat of vulcanization is on also reduces the amount of skill and labor necessary in properly seating the compound and forcing the compounds into the matrix prior to the vulcanization operation.

Other objects of the invention will appear from the following specification directed to the most approved manner known to me, of practising my process, reference being had to the attached drawing descriptive of my improved product and illustrative of certain steps of the process.

In the said drawing Figure 1 illustrates the manner in which the type is assembled for producing the matrix in which the impression face of the stamp is formed. Fig. 2 is a sectional view through the matrix body and the type therein. Fig. 3 is a perspective view showing a section of the matrix after the removal of the type therefrom. Fig. 4 is a view of the matrix of Fig. 3 illustrating the old and common process practised in treating the type impression stratum of unvulcanized compounds in the matrix for forming the impression face thereon. Fig. 5 is a perspective view of a portion of specially prepared unvulcanized rubber compound consisting of two strata of the differently prepared compounds each having rubber or other vulcanizable gums as one of the ingredients of the compounds. Fig. 6 is a view similar to Fig. 5 illustrating the manner in which I place the adhering strata of type impression compound and cushioning compound both unvulcanized, in the matrix prior to vulcanization. This view shows the unvulcanized compounds lying flat on the bottom of the matrix but not yet having received the type impression from the matrix. Fig. 7 is a view similar to Fig. 6 illustrating the cushioning and type impression compounds assembled as in Fig. 6 at the close of the application of vulcanizing heat, and Fig. 8 illustrates the united vulcanized strata of type impression compound and cushioning compound after cooling and removal from the matrix, the same being ready for mounting in suitable hand frames or holding devices of any desired character as illustrated by the sectional views of Figs. 9 and 10, the former being a longitudinal section through the stamp and frame and Fig. 10 being a cross section of the same.

In this art it has been common heretofore to assemble suitable type of some firm material as metal which is desired to be reproduced on the printing face of the rubber impression stamp as illustrated in Fig. 1, the type being designated by the reference character 10 and the assembly frame by the reference character 11. The assembled type are then used to form an impression in suitable material, usually of a plastic nature, as a compound of clay and putty, which may be hardened usually by the application of heat to form a matrix in which the impression face of the rubber compound may be molded under some pressure if desired. The material of such a matrix is designated by the reference character 12 in Fig. 2 to Fig. 4 inclusive and in Figs. 6 and 7. If the type are of a material which will withstand some degree of heat the matrix may be hardened before the type are removed, after which the hardened matrix will appear as in Fig. 3, the type portion appearing in intaglio in that view. In Fig. 4 the reference character 13 designates a stratum of rubber compound type material which has been forcibly pressed into the intaglio bottom of the matrix impression chamber designated by the reference character 14, Fig. 3. This manner of forming a type stratum necessitates the practice heretofore common of vulcanizing the stratum of type compound and then cementing it upon suitable cushioning material after vulcanization. In practising my invention the stratum of type compound is not introduced alone into the matrix type forming chamber but the unvulcanized type and cushioning compounds after being formed in sheets of the desired thickness as indicated by the perspective view of Fig. 5 the type stratum being designated by the reference character 15 and the cushioning stratum by the reference character 16, are caused to physically unite by the use of some suitable solvent of the compounds such as the lighter hydrocarbons like benzin or naphtha or under certain conditions the stratum of the type forming compound 15 may be caused to unite with the stratum of cushioning compound 16 by physically forcing them together by calendering rollers or other suitable pressure devices. Obviously the specific ingredients entering into the rubber type compound is not an essential feature of my invention as any vulcanized compound that will vulcanize into a piece of rubber having the desired texture and continuity of structure to make suitable stamp type may be employed. In order however, to procure the most desirable results in stamp type vulcanized from the compounds of rubber it is desirable that the stratum 15 of the type compound shall be from ingredients which will form gases upon the application of vulcanizing heat, it being well known that gas forming materials mixed with the rubber compound prior to vulcanization will result in rubber of a spongy and cellular character in the vulcanized product. For this reason the cushioning stratum 16 of the raw rubber compound is composed of vulcanizable ingredients having intimately co-mingled therewith any well known gasifying ingredients of which water and bicarbonate of soda are well known examples so that upon the vulcanization of the cushioning stratum of the compound 16, the same will be greatly expanded into a well formed sponge rubber, while the stratum of type compound will obviously be unaffected by the gases generated in the cushioning stratum. It is well known in the manufacture of sponge rubber that although a portion of the gases formed escape a large part of the gas will remain within the formed cells of the sponge rubber later to escape or condense upon cooling leaving the sponge rubber in an expanded condition making a desirable cushion for the attached and synchronously vulcanized type stratum 15.

Experiments I have made in carrying out my process as herein described have demonstrated, particularly where the cushioning stratum of the compound is vulcanized on the upper and more exposed or open side of the matrix, that any gas formed in the cushioning stratum will not permeate or disturb the continuity of the rubber type compound at the completion of vulcanization, while the cushioning stratum will result in a perfect piece of sponge rubber, just as when vulcanized independently of the type stratum and both strata will be perfectly united by the vulcanizing operation so that in so far as strength is concerned the united strata will be as strong along the surface where the union took place during vulcanization as at other points in the structure of each, thus eliminating a tendency toward peeling or separation of the type and cushion strata.

Another important feature of my invention is graphically illustrated in Fig. 6 and Fig. 7. In Fig. 6 the stratum of the type forming compound is shown resting lightly upon the bottom of the matrix, while in Fig. 7 the material of the compound is illustrated as having been forced into the depressions of the bottom of the type forming matrix. This in practice heretofore has been accomplished by the application of pressure usually when the compound is in more or less cool condition just as the type forming compound 13 of Fig. 4, is forced into the bottom of the matrix to form the type impressions thereon.

Owing to the fact that in my improved process the stratum of cushioning compound is also within the matrix, by properly proportioning the height of the matrix and closing the same by a cover as designated by the reference character 17 which is preferably clamped tightly over the top of the matrix, the matrix chamber is closed and upon application of the vulcanizing heat the type forming compound 15 will soften while the material of the cushioning stratum 16 will expand or increase its former volume under the influence of vulcanizing heat, as is well known in the vulcanization of sponge rubber, due to the expansion of the gas forming ingredients contained therein. When the chamber of the matrix is closed by the plate 17, as illustrated in Figs. 6 and 7, obviously any expansion particularly of the stratum 16, beyond taking up whatever space there may be between this stratum and the plate, will result in the application of a downward pressure upon the type forming stratum 15, which is already softened under the influence of the vulcanizing heat, and the result is a pressure of an ideal character for forcing the plastic or semi-plastic type forming stratum of the compound into the intaglio grooves of the matrix, resulting in the formation of a printing face on the type stratum 15, of an improved character over processes heretofore employed in the formation of rubber type because of the utilization of this pressure.

Upon removal of the matrix and the plate 17 thereon, as illustrated in Fig. 7 from the vulcanizing chamber and after the desired cooling, the cushioned type may be removed from the matrix and is ready for securement in any suitable holding frame as for example, the common form of hand stamp in which the type holding frame is of wood or metal provided with handle 19, and a suitable depression into which the cushion stratum 16 of the type may be suitably secured as by cement as illustrated in Fig. 9 and Fig. 10.

While I have illustrated and described the manner in which the matrix for forming the stamp may be prepared it will be apparent that other methods may be employed in producing the matrix of the character to be employed. For example my improved type forming compound made up of the united strata may be used in connection with the matrix formed or cut by any available process other than the common one of molding the matrix by the use of ordinary printers' type.

What I claim is:

1. The herein described method of making a rubber type stamp which consists in physically uniting two strata of unvulcanized rubber compounds, one stratum of said compounds being suitable for making the type face of a rubber stamp, the other stratum being impregnated with a material adapted to assume gaseous form upon the application of vulcanizing heat, then placing the united strata of compounds in a type forming matrix and submitting the whole to a vulcanizing heat whereby the said strata of compounds will integrally vulcanize.

2. The herein described method of making a rubber type stamp which consists in physically uniting two strata of unvulcanized rubber compounds, one stratum of said compounds being suitable for making the type face of a rubber stamp, the other stratum being impregnated with a material adapted to assume gaseous form upon the application of vulcanizing heat, then placing the united compounds in a closed type forming matrix so constructed that upon the application of the vulcanizing heat the strata will be integrally vulcanized and the heat of vulcanization will expand the gas impregnated stratum whereby the volume of the combined strata will exceed the volume of the matrix chamber thus exerting a pressure for forcing the material of the type forming stratum into the type forming recesses of the matrix.

3. The herein described method of making a rubber type stamp which consists in placing a stratum of type forming rubber compound next to the character forming recesses in a type forming matrix with an additional stratum of vulcanizable compound impregnated with a material adapted to assume gaseous form upon the application of vulcanizing heat, then closing the matrix and applying the heat of vulcanization, whereby the gas forming material in the last said compound will result in a porous cushioning backing for the type stamp and the expansion thereof during vulcanization will result in the application of pressure upon the stratum of type forming compound, and thereby forcing same into the character forming recesses in the matrix and at the same time compacting the type forming compound.

In testimony whereof I have signed my name to this specification, in the presence of two subscribing witnesses, on this 30th day of October, A. D. 1917.

JOSEPH ELLIS.

Witnesses:
K. DAVITT,
VERA FORSLUND.